June 21, 1960 G. DE SOCIO 2,942,201

BAND PASS DISTRIBUTED AMPLIFIER

Filed Nov. 10, 1958

INVENTOR.
GEORGE De SOCIO

BY Wade Koontz AND S. A. Strickler
ATTORNEYS

United States Patent Office 2,942,201

Patented June 21, 1960

2,942,201

BAND PASS DISTRIBUTED AMPLIFIER

George de Socio, Baltimore, Md., assignor to the United States of America as represented by the Secretary of the Air Force Filed Nov. 10, 1958, Ser. No. 773,121

4 Claims. (Cl. 330—54)

This invention relates to a band pass distributed amplifier and particularly to a distributed amplifier utilizing a T-filter for each stage.

The principles of distributed amplification, including a description of the basic theory of operation of each system, was presented by Percival in British Patent 460,-562, dated July 15, 1936, and discussed in the article entitled "Distributed Amplification," appearing in the Proceedings of the I.R.E., vol 36, page 956 (1948), by Ginston, Hewlett, Jasberg and Moe.

The use of the heretofore known distributed amplifier circuits for medium power levels has proven uneconomical and nonefficient because of the necessity of utilizing high powered tubes in order to realize the required gain.

The present invention provides a medium powered level band pass distributed amplifier utilizing conventional miniature tubes.

The distributed amplifier according to the invention is constituted by a succession of T-filter sections isolated at the D.C. by RF chokes.

It is accordingly an object of the invention to provide an efficient medium power distributed amplifier.

It is a further object of the invention to provide a distributed amplifier using conventional miniature tubes.

It is another object of the invention to provide an improved distributed amplifier section.

Other objects and advantages of the invention will be apparent from the following description in which.

Figure 1:
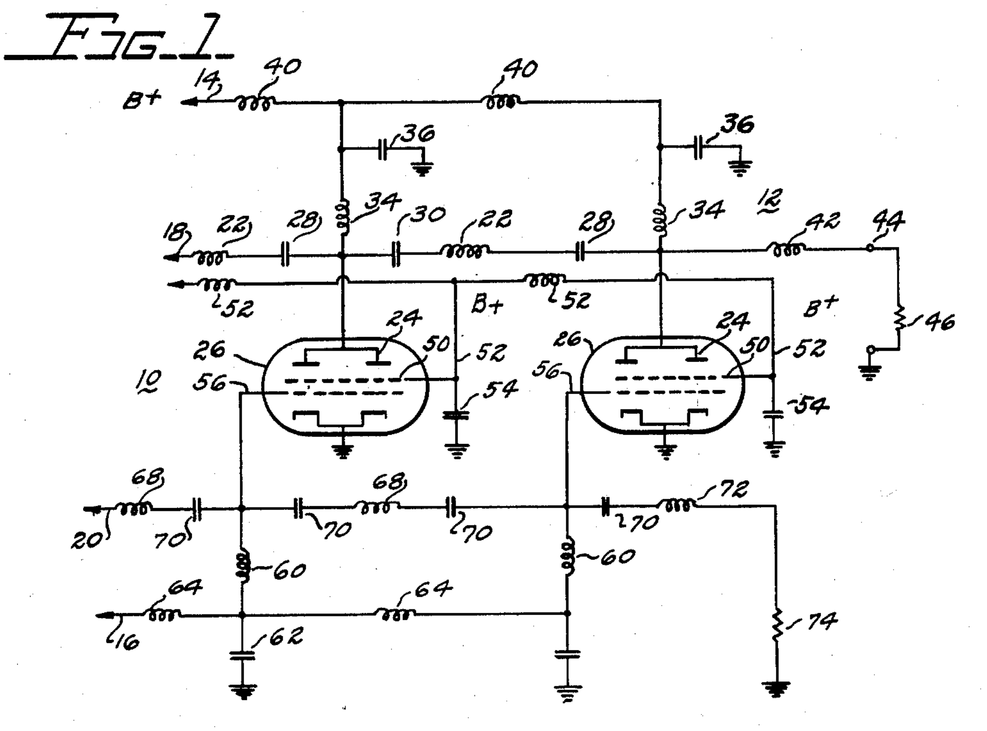
Fig. 1 is a schematic diagram of representative stages of a driver band pass distributed amplifier.

In the exemplary embodiment according to the invention the distributed amplifier is constructed of a plurality of T-filter sections, Fig. 1 showing a typical line section 10 and a typical terminal section 12. Obviously, any number of line sections can be assembled to secure the desired power output.

The filter sections 10 and 12 are supplied by a power supply line 14, a grid bias line 16, or a plate line 18 and a grid line 20.

Each filter section is constituted by an inductance 22 coupled to the anodes 24 of a pentode tube 26 by means of the capacitors 28 and 30. Power is supplied from line 14 to the anodes 24 from a power source, not shown, through an inductance 34 having a filter capacitor 36 to ground. Radio frequency chokes 40 are supplied in the line 14 to isolate the sections in the power supply line. A terminal section 12 has the output plate line 18 supplied with an inductance 42 which is of half the value of the coupling inductance 22. Output terminal 44 is connected to a load 46 which is returned to ground. Grids 50 of the pentode 26 are supplied with positive potential from a power source through a radio frequency choke 52 and maintained at the desired potential with respect to ground by means of a capacitor 54 connected between the grid 50 and ground. The control grid 56 is connected to a grid bias line 16 over an inductance 60 and oriented with respect to ground by a capacitor 62. The sections 10—12 are isolated at radio frequency on line 16 by means of radio frequency chokes 64. The grid supply line 20 for the incoming signal is constructed substantially similar to plate line 18 and is constituted by line inductances 68 and capacitors 70 to provide the desired delay between sections. The final or terminal section 12 is provided with a reactor 72 of half the value of the reactors 68, reactors 72 being preferred to ground through a suitable impedance 74.

Figure 2:
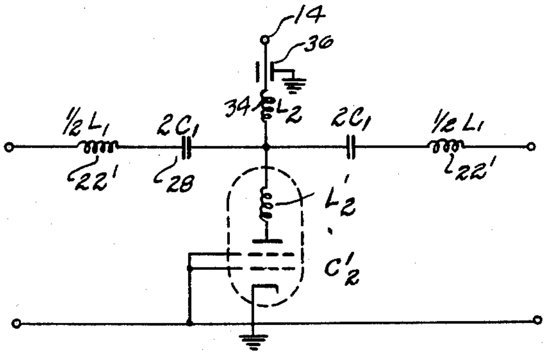
Fig. 2 is a simplifier showing of the T-filter configuration of the stage.
Figure 3:
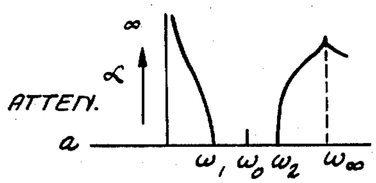
Fig. 3 is a characteristic diagram for the stage.

The construction and operation of this T-filter will be best understood from Fig. 2 showing the simplified T-section and Fig. 3 showing the characteristics of the section.

The utilization and operation of the circuit is easily understood from the calculation of a typical application such as a band pass distributed amplifier having a power output of 8 watts max., a band pass from $f_1$ of 50 mc. to $f_2$ of 210 mc. with a low output impedance of 75ω. In order to provide specific data for calculation a specific tube (Amperex type 6360, twin tetrode) is utilized as an example. However, any similar tube can be used with its specific data.

Measured values for this tube with both sections connected in parallel are as follows:

$G_m \cong 7000$ μmho; input inductance=.02 μhenry; input capacitance =15.5 μμfd.; output inductance=.017 μhenry; output capacitance=9.7 μμfd. (All measurements including socket leads and capacitance.)

The equations for the derivation of the line parameters are well known (for example see Terman, Radio Engineer's Handbook) and are as follows:

$$f_1=50 \text{ mc.};\ f_2=210 \text{ mc.};\ f_\infty=\frac{1}{2\pi\sqrt{L'_2C'_2}}$$

$$R_0=\frac{BW}{\omega_0}2\pi\sqrt{\frac{L_{1k}}{C_{1k}}} \text{ (at band center)}$$

$$h=\sqrt{\left[1-\left(\frac{\omega_1}{\omega_\infty}\right)^2\right]\left[1-\left(\frac{\omega^2}{\omega_\infty}\right)^2\right]}$$

$$a=\frac{(1-m_1^2)\omega_\infty^2}{4\omega_1\omega_2}$$

$$m_1=\frac{\omega_1\omega_2}{\omega^2}+h$$

$$L_1=m_1L_{1k}$$

$$L_2=\alpha L_{1k}$$

$$L'_2=\frac{(1-m_1^2)}{4h}L_{1k}$$

$$C_1=C_{1k}$$

$$C_2'=\frac{h}{\alpha}C_{1k}$$

It is desirable from an operational standpoint to keep $\omega_\infty$ as high as possible. It was found that the tube lead inductances and capacitances would establish an upper limit to $f_\infty$, or a frequency of 300 mc., approximately. The grid elements have the lower resonant frequency. The plate circuit can be matched for the same $f_\infty$ provided a high enough Q could be realized. However, this is not the case and an $f_\infty$ of 300 mc. for the plate line 18 is assumed, although because of the low Q of the circuit, it is not practical to add the series inductance necessary. It can be shown that the phase velocity of the different lines is not materially different, provided $f_1$ and $f_2$ are maintained the same. It is not intended to give the impression that this phase error is independent of $f_\infty$, but that it is small if $f_\infty$ of each line are close to each other and far enough from $\omega_2$, say of order 10–20% higher.

*Transmission line calculations*

A. Grid line:

$C_2'=15.5\ \mu\mu\text{fd}.\ L'_{2g}=0.02\ \mu\text{h}.$ $f_\infty=300\ \text{mc}.\ f_1=50\ \text{mc}.\ f_2=210\ \text{mc}.$ Calculated:

$h=.704,\ m_1=.82,\ \alpha=.71$ (from Fig. 3)

$$\frac{\alpha}{h}=\frac{.71}{.704}=1.00^+$$

$$L_{1k}=L_2'\frac{.4h}{(1-m_1^2)}=\frac{.02\times 4\times .704}{.33}=.169\ \mu\text{h}.$$

$$C_{1k}=\frac{\alpha}{h}C_2'=15.5\times 5\times 1.00^+=15.6\ \mu\mu\text{fd}.$$

$L_1=m_1L_{1k}=.82\times .169=.138\ \mu\text{h}.$ $L_2=\alpha L_{1k}=.71\times .169=.12\ \mu\text{h}.$ $C_1=15.6\ \mu\mu\text{fd}.$ $$R_{0g}=\frac{160}{\sqrt{f_1f_2}}\sqrt{\frac{L_{1k}}{C_{1k}}}=85\omega$$

IMA–52–3

B. Plate line:

$C_2'=9.7\ \mu\mu\text{fd}.\ L_2'=.017\ \mu\text{h}.$ (tube alone)

$f_\infty=300\ \text{mc}.,\ f_1=50\ \text{mc}.,\ f_2=210\ \text{mc}.$ $h=.704 m_1=.82,\ \alpha=.71,\ a/h=1.00^+$ $$L_2'=\frac{1}{(2\pi f_\infty)^2C_2'}=.029\ \mu\text{h}.$$

$$L_{1k}=\frac{.029\times 4\times .704}{.33}=.248\ \mu\text{h}.$$

$$C_{1k}=\frac{\alpha}{h}\cdot 9.7\ \mu\mu\text{fd}.-9.8\ \mu\mu\text{fd}.$$

$L_1=.82\times 0.248=0.203\ \mu\text{h}.$ $L_2=\alpha L_{1k}=.71\times 0.248=0.176\ \mu\text{h}.$ $C_1=9.7\ \mu\mu\text{fd}.$ $R_{0p}=125\omega$ load resistance of the line necessary for a matched condition

*Gain calculations*

The low signal voltage gain of the amplifier tube section is well known, and is:

$$G=g_m\times\frac{R_{0p}}{2}\ \text{and for N tubes}\ G_N=\frac{g_mN}{2}R_{0p}$$

will gain normalized to the input impedance, we get $$G_N=\frac{g_mH}{2}\sqrt{R_pR_g}$$

To solve for N, set $G_N$ equal to $\epsilon$ the optimum configuration. The minimum number of tubes figures to be 8 tubes. The power capabilities of each tube, however, in approximately .7 watt for both sections in parallel. Since the requirement is 8 watts max., at least 10 tubes should be used. Gain on this basis is 3.6 or 11 db.

For purpose of exemplification a particular embodiment has been shown and described according to the best present understanding thereof. However, it will be apparent to those skilled in the art that various changes and modifications in the construction and arrangement of the component parts thereof can be resorted to without departing from the true spirit and scope of the invention.

I claim:

1. A band pass distributed amplifier comprising a plurality of parallel connected sequentially operating tubes each tube including a plate, a control grid and a cathode, a common power supply line for said tubes, an individual reactor connecting the plate of each tube to said supply line, each of said cathodes being connected to ground, a capacitor in shunt with each tube and its associated reactor, a radio frequency choke in said supply line between successive tubes, a common bias line for said control grid of each tube, a reactor connecting said bias line to said control grid in each tube, a capacitor referring said bias to ground for each tube, a radio frequency choke in said bias line between each of said grids, a plate line connected to the plates of said tubes, said plate line including a reactor connected between successive plates, and a capacitor in said plate line between said reactor and each of said successive plates, a grid line connected to each of said grids, a reactor in said grid line between each grid, a capacitor in said grid line between each reactor and the adjacent grids.

2. A band pass distributed amplifier comprising a plurality of parallel connected, sequentially operating sections each of said sections including a plurality of parallel connected discharge paths, each of said discharge paths having a plate, a cathode and at least a first and a second control grid, a common supply circuit for each of said plates, a radio frequency-isolating device in said common supply line between each of said plurality of parallel connected discharge paths, a reactor connected in series between the discharge paths of each section and said supply circuit, a capacitor connected in shunt with said reactor and the discharge paths in series therewith, a common bias circuit for said first control grid in each of said discharge paths, a radio frequency-isolating device in said bias circuit between each of said sections, a plate line connected to the plates of each of said sections, said plate line including a reactor in series between each of said sections, and a capacitor in series circuit relation between each of said plate line reactors and the adjacent discharge paths, a grid line connected to said first control electrodes, a reactor in said grid line between each of said sections and a capacitor in said grid line between each of said grid line reactors and each adjacent first grid.

3. A band pass distributed amplifier comprising a plurality of parallel connected, sequentially operating sections, each of said sections including a plurality of parallel connected discharge paths, each of said discharge paths having a plate, a cathode and at least a first and a second control grid, a common supply circuit for each of said plates, a radio frequency-isolating device in said common supply line between each of said plurality of parallel connected discharge paths, a reactor connected in series between the discharge paths of each section and said supply circuit, a capacitor connected in shunt with said reactor and the discharge paths in series therewith, a common bias circuit for said first control grid in each of said discharge paths, a radio frequency-isolating device in said bias circuit between each of said sections, a plate line connected to the plates of each of said sections, said plate line including a reactor in series between each of said sections, and a capacitor in said plate line in series circuit relation between each of said plate line reactors and the adjacent discharge paths, a grid line connected to said first control electrodes, a reactor in said grid line between each of said sections and a capacitor in said grid line between each of said grid line reactors and each adjacent first grid, a second common bias line connected to said second grids, a radio frequency-isolating device in said second line between each section.

4. A band pass distributed amplifier comprising a plurality of parallel connected, sequentially operating sections each of said sections including a plurality of parallel connected discharge paths, each of said discharge paths having a plate, a cathode and at least a first and a second control grid, a common supply circuit for each of said plates, a radio frequency-isolating device in said common supply line between each of said plurality of parallel connected discharge paths, a reactor connected in series between the discharge paths of each section and said supply circuit, a capacitor connected in shunt with said reactor and the discharge paths in series therewith, a common bias circuit for said first control grid in each of said discharge paths, a radio frequency-isolating device in said bias circuit between each of said sections, a capacitor connected between said bias line and ground in each section, a reactor connected between said bias line and the first grids of each section, a plate line connected to the plates of each of said sections, said plate line including a reactor in series between each of said sections, and a capacitor in a series circuit relation in said plate line between each of said plate line reactors and the adjacent discharge paths, a grid line connected to said first control electrodes, a reactor in said grid line between each of said sections and a capacitor in said grid line between each of said grid line reactors and each adjacent first grid.

References Cited in the file of this patent

UNITED STATES PATENTS

| | | |
|---|---|---|
| 2,745,004 | Yu | May 8, 1956 |
| 2,790,956 | Ketchledge | Apr. 20, 1958 |
| 2,863,006 | Diambra et al. | Dec. 2, 1958 |

OTHER REFERENCES

Publication, Electronics, July, 1951, pages 106–111, "Millimicrosecond Oscillography," by Y. P. Yu et al.